June 2, 1925.
K. M. HENRY
1,540,264
PROCESS OF ANNEALING GLASS
Filed Oct. 11, 1922
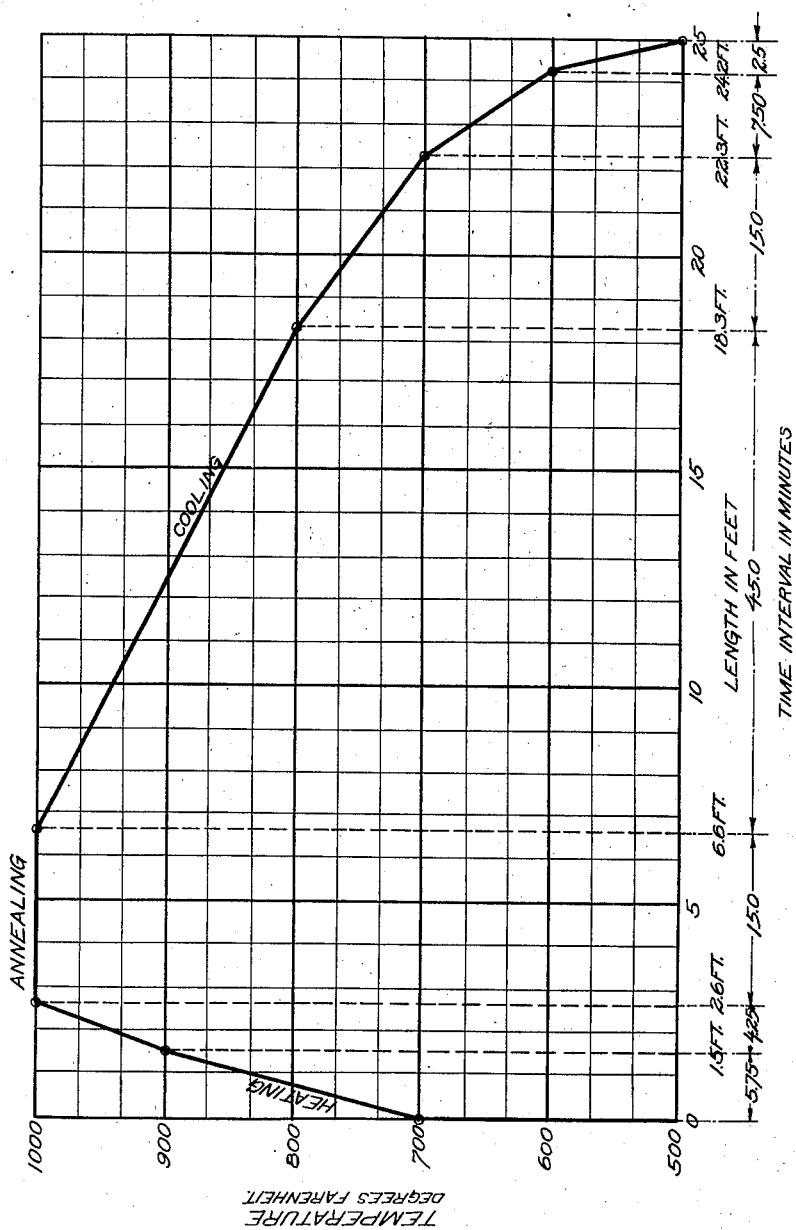
Inventor
Kenneth M. Henry
By Dewey, Strong, Townsend & Loftus
Attorneys.

Patented June 2, 1925.

1,540,264

UNITED STATES PATENT OFFICE.

KENNETH M. HENRY, OF SAN FRANCISCO, CALIFORNIA, ASSIGNOR TO ILLINOIS-PACIFIC GLASS COMPANY, OF SAN FRANCISCO, CALIFORNIA, A CORPORATION OF CALIFORNIA.

PROCESS OF ANNEALING GLASS.

Application filed October 11, 1922. Serial No. 593,902.

*To all whom it may concern:*

Be it known that I, KENNETH M. HENRY, a citizen of the United States, residing at the city and county of San Francisco and State of California, have invented new and useful Improvements in Processes of Annealing Glass, of which the following is a specification.

This invention relates to the annealing of glass and has for its object to shorten the time required for annealing and to insure uniformity in the product.

The term "annealing" is not used in the ordinary sense, i. e., as used in metallurgy, where it denotes a change in crystal structure by some form of heat treatment. As used in the glass industry, annealing means the removal of stresses and strains set up by a temperature gradient in the glass after the glass article has been formed. For example, if a glass bottle after being blown were allowed to cool unhindered in the air the probabilities are that it would be shattered by the stresses produced within the glass walls before it reached room temperature. If by any chance it did manage to cool down, it would be susceptible to fracture at the slightest variation in temperature.

There is for every type of glass an annealing range of temperature. The lower limit of this range is defined as the temperature at which internal adjustment of strain and stress by internal flow practically ceases, or as the temperature at which annealing first proceeds very slowly, and the upper limit is defined as that temperature at which internal stress and strain are adjusted or eliminated practically instantaneously, but at which temperature the glass object being annealed will not retain its form to a satisfactory degree.

The upper limit of the annealing range is referred to in ordinary practice as the annealing temperature, and the process of annealing glass as heretofore practiced consists in heating the glass objects momentarily to this high temperature at which all the internal stress and strain disappear practically instantaneously, and then cooling the objects very slowly to a temperature at which they can be handled.

Glass objects in being cooled from the temperature corresponding to the upper annealing range, to the temperature corresponding to the lower annealing range, necessarily acquire some internal stress and strain unless the cooling be carried out infinitely slowly, which is of course not practical. This will be understood by assuming that a glass object when at the highest annealing temperature is uniformly heated throughout, and as it cools there is necessarily a temperature gradient from the hotter inside to the cooler outside, which sets up a stress and strain corresponding to tension in the outside layers and compression in the interior, which stress and strain are eliminated or adjusted by internal flow more slowly as the glass cools, because of the necessary viscosity or resistance to flow as the temperature lowers.

Bottles are nearly always strained at some point in their production. The glass comes from the melting furnace at about 2000° while in a very plastic state, and is dropped into an iron mold which is at a very considerable less temperature, probably around 600°. To this chilling effect on the outside skin of the bottle is added the chilling effect of the relatively cold air used in blowing the glass to the form of the mold. Thus a temperature gradient is set up from both sides to the inner part of the glass walls and strains result. These particular strains might be removed automatically if the glass were allowed to stand for a sufficient length of time at the temperature of the inner part of the wall, but the bottle is now removed from the mold and placed on the conveyor where air currents, which can only chill the outside of the bottle, strike it. Other influences are also prevalent, but they produce the same type of strain and are treated in the same manner as the strains described above.

Hitherto the process of annealing glass was as follows: The temperature necessary to cause the immediate disappearance of strains is just short of the softening point. This naturally varies with different glasses, due to different chemical compositions and so must be determined for every glass. The glass is then heated to the annealing temperature. From this point the bottles are very slowly cooled to room temperature. As far as can be determined no actual curves have ever been plotted for this cooling. If the bottles failed to anneal in a new lehr its length would probably be extended as it would be assumed that the lehr was too short and consequently that the ware cooled too rapidly. This is evidenced by the fact that lehrs are found in practice from 50 to 80 feet in length.

As a means of reducing the time of annealing, and insuring a proper annealing of glass objects, and particularly bottles, I bring the temperature of the annealing lehr as rapidly as possible up to a point below the maximum annealing temperature, which is first determined by suitable tests. For example, in tests which I have made with a glass such as is ordinarily used in bottles, the maximum annealing temperature is in excess of 1000° Fahrenheit. By keeping the temperature below maximum annealing temperature, the adjustment of strains and stresses naturally occurs rather slowly, and at the end of a reasonable lapse of time, say fifteen minutes, there will still be present temporary stresses or strains. I then cool the glass object at a rather rapid rate, say 6° per minute, until the lower annealing temperature is reached, which in the specific instance illustrated herein would be approximately 800°. Beyond this point the cooling is carried out as rapidly as the mechanical strength of the glass will permit. The result of this rapid cooling is to remove or neutralize the temporary stresses or strains remaining in the glass at the end of the first stages of the process.

The temperature curve for a 25 foot section of lehr is shown in the accompanying drawing.

The bottle is heated as rapidly as the furnace will permit until 1000° is reached. The temperature is then held constant at this point for 15 minutes and the cooling started at a uniform rate of 6° per minute until 800°. From 800° the cooling rate is increased, and increased progressively until the temperature is 500°. The doors of the furnace are now opened and the bottle allowed to cool off in the air. The only precaution to be taken for the cooling after 500° is not to allow the bottle to cool so rapidly that a temporary strain of sufficient magnitude will be introduced as to cause fracture as was explained previously.

To apply this curve in practice the first step is to determine the capacity, in pounds per hour, that the lehr should handle. The only other data for the design is the length of time for the annealing to take place. From these two factors the length, width and speed of the conveyor can be calculated. The length is the distance in the furnace in which the temperature is controlled and does not include that necessary to cool the bottles from 500° to room temperature. An additional 25 feet may be added for this purpose. The annealing section of the curve allows a maximum variation of only plus or minus 10° from the true curve and the cooling section to 800° only plus or minus 5°.

My choice of the cooling rate of 6° Fahrenheit per minute is based upon the fact that with the glass I am annealing I have found that such a rate imparts a condition of stress and strain at the lower annealing temperature which is of such nature and magnitude that it will be entirely eliminated by the elimination of the temperature gradient which is effected by the complete cooling of the glass. Such a condition of stress and strain is known as a temporary stress and strain, and is the same as that which would be imparted to the completely annealed and unstrained glass objects in heating from atmospheric temperature to the lower annealing temperature if the objects were heated at the same rate and conditions as is found in the cooling section of my process. I have added this because it would be possible by heating the glass slowly to arrive at the same point without internal strain. The choice of this cooling rate is further predicated upon the nature of the glass and the upper annealing temperature, and the time during which it is maintained, and must be determined by trial for each class of glass.

It should be understood that the cooling rate of 6° Fahrenheit per minute which I employ from the upper to the lower annealing temperature is a very rapid rate of cooling compared with present practice, and this rapid rate of cooling is an important feature of my invention, because it naturally results in a reduction of the total annealing time; but it is also an essential factor in imparting the nature and extent of stress and strain at the lower annealing temperature which I have defined above as temporary stress and strain.

It will be noticed that contrary to prior practice the whole annealing curve is controlled very closely. This is not only necessary for this type of an annealing curve but also it gives information as to where to look for trouble if the bottles should not anneal for some cause or other. In other words if the bottles are not annealed it means that some part of the cycle is not complying with the curve. By looking at the instruments placed at the proper intervals throughout the lehr it is possible to tell which section of the curve is not up to the proper place and the necessary corrections can be made. If the furnace is automatically controlled such trouble is hardly ever experienced.

With this method, the bottle issues from the lehr three hours from the time that it was put in. This is a considerable saving of time over the older types, some of them taking as long as 10 hours for the annealing.

Due to the automatic control the annealing is always the same and the product can be depended upon to be perfectly annealed. Consequently there is no breakage.

As there are no gases of combustion the bottles issue from the lehr bright and clean. They are also as sterile as it is possible to produce bottles on a commercial scale.

This curve is to be applied to the annealing of glass such as is used in the manufacture of bottles, containers, etc. This kind of glass generally comes within the following chemical composition:

80 to 60% silica, 25 to 10% soda, 20 to 5% lime, and varying amounts of alumina and magnesia up to 10%.

Having thus described my invention, what I claim and desire to secure by Letters Patent is:

1. The method of annealing glass which consists in first heating to a temperature less than the maximum annealing temperature, maintaining this temperature for a length of time sufficient to partially remove internal stress and strain, cooling rapidly to the lowest annealing temperature of the glass being treated, and thereafter cooling more rapidly, to atmospheric temperature, whereby the internal stress and strain existing at the end of the heating stage will be substantially neutralized during the cooling stage.

2. The method of annealing glassware which consists in quickly heating the glass to a temperature of approximately 1000° F., maintaining this temperature for approximately 15 minutes and thereafter cooling the glass at the rate of 6° per minute.

3. The method of annealing glassware which consists in quickly heating the glass to a temperature of approximately 1000° F., maintaining this temperature for approximately 15 minutes, thereafter cooling the glass at the rate of 6° per minute until 800° is reached and then increasing the rate of cooling.

KENNETH M. HENRY.